W. H. ROYSTONE.
SALES REGISTRATION CARD.
APPLICATION FILED SEPT. 23, 1920.

1,396,288.

Patented Nov. 8, 1921.

Witnesses:
J. Goedberg.
Paul Pearl

Inventor:
William H. Roystone.

UNITED STATES PATENT OFFICE.

WILLIAM H. ROYSTONE, OF NEW YORK, N. Y.

SALES-REGISTRATION CARD.

1,396,288.　　　　Specification of Letters Patent.　　Patented Nov. 8, 1921.

Application filed September 23, 1920. Serial No. 412,330.

*To all whom it may concern:*

Be it known that I, WILLIAM H. ROYSTONE, a citizen of the United States, residing at #306 W. 42nd St., in the city, county, and State of New York, have invented new and useful Improvements in Sales-Registration Cards, of which the following is a specification.

This invention relates to improvements in sales registration cards, the object of which is to register sales with greater ease and accuracy than has hitherto been possible, and to afford means of rapidly cross checking the total sales made.

I attain these objects by the devices illustrated in the accompanying drawing in which Figure 1 is a view of my sales registration card representing the twenty units of one dollar: Fig. 2 is a view of the blank unit torn from the card and constitutes a salesman's voucher for a five cent sale. Fig. 3 is a view of the card with the blank unit taken therefrom and constitutes the cashier's voucher for the amount paid by the customer: Fig. 4 is a view of the card showing the (twenty) five cent units of two dollars and Fig. 5 is an alternate arrangement of my device in which five columns are used.

Similar letters refer to similar parts throughout the several views.

My invention consists of a ticket or card divided into the required number of marked spaces and one blank space, all but the uppermost of which are detachable from the head of the card, each space representing a unit five cents higher than the one below, the card itself optionally representing less, or more than one dollar, as the trade of the restaurant, store, or other establishment in which it may be used demands.

The customer on entering receives one of the cards ordinarily printed with the units of one dollar, Fig. 1. On making a purchase, the salesman takes card and tears from it all units of less amount than that representing the purchase, and then returns card to the customer. When each additional purchase is made this procedure is repeated. Should the customer make a purchase totaling more than the remainder of his card can register, the salesman exchanges it for a new card of sufficiently large denomination (Fig. 4) to cover his purchase. A similar exchange may possibly be made by several salesmen before the customer obtains all that he may need. On leaving the store the customer presents his card to the cashier, and pays the lowest amount, as per instructions printed thereon.

At closing time each salesman returns the units abstracted from his customers' cards to the office. These vouchers which represent the amount of his sales for the day, should total (including the blanks, when counted at five cents per unit) with the amount paid by his customers, thus double checking the business done. The registration card hitherto used is objectionable as it requires each amount sold to be punched upon one of its printed units. This process is not only tedious and wasteful of the salesman's time, but the reading of the various punch marks requires special attention on the cashier's part, who often, to his loss, fails to observe the highest amount punched.

My registration card overcomes these difficulties by eliminating the punching, and presenting but one amount, always found in the same relative position to the cashier's attention.

My card, which is preferably divided into two columns of units, may also be divided into a greater number as in Fig. 5.

The marked units in my invention, unlike those in the card hitherto used, invariably read from the bottom to the top, thus requiring the lower amounts to be placed at the bottom of each column, and not at the bottom of one and the top of the next one as hitherto arranged. This method allows the salesman to remove any number of the units but the topmost, which, being the only and lowest amount, the customer, following the printed directions at top of card, pays.

To facilitate the separation of the units as the sales are made, I cut and perforate the card around its units so as to permit their rapid removal as required, and yet enabling the card with portions of its lines not perforated to hold its units together, even under the most careless handling of ordinary use.

The long vertical perforation A is placed between the ends of the short cross perforations B, B, which terminate at a suitable distance from it, so as not to weaken the card. The ends of the perforation A terminate in a blank space for the same reason.

In order to prevent tearing across the entire card when separating the units from it, the short perforations B, B are staggered against each other.

In order to permit the rapid separation of the units required from the body of the card and to avoid the use of the space consuming V notch for that purpose, I terminate the perforations B, B, at their outer ends with a cut C of about equal length to the perforation.

Should a customer be inadvertently overcharged the salesman may return to him the mistakenly abstracted unit, marking it and the customer's card for identification and explanation to the cashier. Should a customer leave the store without making a purchase he returns the card intact.

The blank spaces of my card may, of course be utilized for the private printed information of the store using it.

Having described my invention, what I claim and desire to secure by Letters Patent of the U. S. is—

1. A sales registration card divided into the required number of units of part of one dollar or of any number of dollars, arranged in two or more columns and having each divisional space marked to represent a unit of higher value than the one immediately below it and having a blank unit below the lowest marked unit as and for the purpose set forth.

2. A sales registration card divided into the required number of units of part of one dollar, or of any denomination of dollars, arranged in two or more columns, and having each divisional space marked to represent a unit of higher value than the one immediately below it, and having a blank unit below the lowest marked unit; the division of each unit by a weakened horizontal line, and blank space, and a weakened vertical line terminating at a distance from the top and bottom edges of the card, as and for the purpose set forth.

3. A sales registration card divided into the required number of units of part of one dollar or of any denomination of dollars, arranged in two or more columns, and having each divisional space marked to represent a unit of higher value than the one immediately below it, and having a blank unit below the lowest marked unit; the division of each unit by a weakened horizontal line, and blank space, and a weakened vertical line terminating at a distance from the top and bottom edges of the card; the horizontal divisional lines being staggered against each other in adjoining columns as and for the purpose set forth.

WILLIAM H. ROYSTONE.

Witnesses:
  I. Goldberg,
  Paul Pearl.